(12) United States Patent
Czarnecki

(10) Patent No.: US 9,011,689 B1
(45) Date of Patent: Apr. 21, 2015

(54) ARTIFICIAL RECHARGE SYSTEM

(75) Inventor: John B. Czarnecki, Little Rock, AR (US)

(73) Assignee: The United States of America, as represented by the Secretary of the Department of the Interior, Washington, DC (US)

( * ) Notice: Subject to any disclaimer, the term of this patent is extended or adjusted under 35 U.S.C. 154(b) by 518 days.

(21) Appl. No.: 13/562,891

(22) Filed: Jul. 31, 2012

(51) Int. Cl.
*C02F 3/32* (2006.01)
*C02F 103/00* (2006.01)

(52) U.S. Cl.
CPC ............. *C02F 3/32* (2013.01); *C02F 2103/001* (2013.01); *C02F 2209/00* (2013.01)

(58) Field of Classification Search
CPC ... C02F 3/32; C02F 2103/001; C02F 2209/00
USPC .................. 210/602, 614, 615, 616, 617, 618, 210/170.03, 143, 97
See application file for complete search history.

(56) References Cited

U.S. PATENT DOCUMENTS

| | | | |
|---|---|---|---|
| 6,467,994 B1 | 10/2002 | Ankeny et al. | |
| 6,840,710 B2 | 1/2005 | Peters et al. | |
| 7,192,218 B2 | 3/2007 | Peters et al. | |
| 7,699,561 B2 | 4/2010 | McCann et al. | |
| 8,002,984 B1 * | 8/2011 | Wanielista et al. | 210/602 |
| 2007/0154262 A1 | 7/2007 | Peters et al. | |
| 2013/0277302 A1 * | 10/2013 | Doelle et al. | 210/609 |

OTHER PUBLICATIONS

Hays, Phil, et al., 2009, Adaptive management of ground water resources to help insure long-term sustainability: 2009 Ground Water Summit Presentations, US EPA Region 6 Water Quality Protection Division, 68 p., <http://www.epa.gov/region6/water/swp/groundwater/gw-summit.htm>.

Author's Name Unknown, 2008, A handbook for stormwater reclamation and reuse best management practices in Hawaii: The Hawaii Commission on Water Resource Management, 149 p., <http://hawaii.gov/dlnr/cwrm/planning/hsrar_handbook.pdf>.

(Continued)

*Primary Examiner* — Fred Prince
(74) *Attorney, Agent, or Firm* — C. Joan Gilsdorf

(57) ABSTRACT

An artificial recharge system and method for recharging an aquifer. The artificial recharge system includes a constructed wetland, a settling pond, and a porous recharge reservoir. The constructed wetland receives water from a surface water source and has aquatic vegetation used to remove sediments and chemicals from the water. The settling pond receives the water from the constructed wetland and provides additional sediment removal. The porous recharge reservoir, which is hydraulically connected to the aquifer, receives the water from the settling pond. The water flows by gravity from the porous recharge reservoir to the aquifer. A backflush tube installed within a sand layer in the porous recharge reservoir is used to remove sediment and particulates from the sand layer.

20 Claims, 6 Drawing Sheets

(56) References Cited

OTHER PUBLICATIONS

Author's Name Unknown, 1988, Design Manual: construsted wetlands and aquatic plant systems for municipal wastewater treatment: US EPA Office of Research and Development, EPA/625/1-88/022, 92 p. (pages submitted include i-viii, 1-8, 15-46) <http://www.epa.gov/owow/wetlands/pdf/design.pdf>.

Author's Name Unknown, 1997, Stormwater management: vol. two: stormwater technical handbook: MA Department of Environmental Protection and MA Office of Coastal Zone Management, 187 p., (pages submitted includes i-iii, 3.A-1-3.C-17, 3.J-1-3.J-5) <http://www.mass.gov/dep/water/laws/swmpolv2.pdf>.

* cited by examiner

ARTIFICIAL RECHARGE SYSTEM

STATEMENT OF GOVERNMENT INTEREST

The invention described herein may be manufactured and used by or for the Government of the United States of America for government purposes without the payment of any royalties therefore.

BACKGROUND

This application relates generally to a system and method of artificially recharging groundwater reservoirs.

Artificial recharge of ground water reservoirs has been used to augment water supplies and to improve water quality of some aquifers. Severe dewatering of the Mississippi River Valley alluvial aquifer in Arkansas has occurred over the last 50 years, resulting in falling water table levels over large areas and decreased water yields to existing wells. Thus, there is a need to recharge the aquifer more efficiently than occurs naturally. Because of the large amount of water removed from the alluvial aquifer, a substantial storage reservoir exists, which, if used effectively, could be an effective alternative to above-ground reservoir storage.

Previous attempts at recharging the aquifer have been costly and the recharge flow rates through the wells have been low. The recharge rates have been low because the performance of recharge through screened injection wells is adversely impacted by (1) air entrapment within the aquifer, (2) sediments lodging within the aquifer, (3) biofouling of the well screen and adjacent sediment, and (4) swelling of clays due to incompatible water chemistry. Specific capacities during injection (i.e., the rate of injection for a unit increase in hydraulic head) have had at least one-quarter the specific capacity of the pumped well. Similar conditions exist in major aquifer systems around the world.

SUMMARY

Aquifers are artificially recharged to enhance the natural rate of recharge and to capture surface water during times of surplus. An aquifer that is less than fully saturated through its entire thickness has the capacity to hold additional ground water, and may be artificially recharged if the system or method used is not cost prohibitive. A major cost in the process is treating the water prior to injection. If pre-treatment can be eliminated (particularly the flocculation of sediment by chemical treatment), then artificial recharge of aquifers may be cost effective. Described herein is such a cost-effective system and method for artificially recharging an aquifer.

The artificial recharge system described in this disclosure includes a constructed wetland, a settling pond, and a recharge gallery or pit. The constructed wetland passively filters out sediment and cleans the source water of potentially toxic substances. The settling pond separates the constructed wetland from the recharge gallery or pit and is used to remove additional sediment not filtered out in the constructed wetland. The recharge gallery has recharge wells constructed into the depleted aquifer and overlying filter layers consisting of sand and gravel. The recharge pit also has sand and gravel filter layers and a depth sufficient to intersect the receiving aquifer so that clean water discharging from the settling pond can flow directly from the recharge pit into the aquifer. A perforated backflush tube installed within the sand layer is used to suspend fine sediment and/or organic material from the sand filter layer for removal. Clean water will flow into the aquifer as long as the water level in the receiving aquifer is less than the water level in the recharge gallery or pit, and the permeability of the aquifer does not decrease deleteriously due to introduction of sediment, biological fouling, and/or air entrainment.

BRIEF DESCRIPTION OF THE DRAWINGS

Various aspects and advantages of the invention will become apparent from the following detailed description, taken in conjunction with the accompanying drawings. The drawings are not necessarily drawn to scale. In the drawings.

DETAILED DESCRIPTION OF THE PREFERRED EMBODIMENTS

Figure 1:
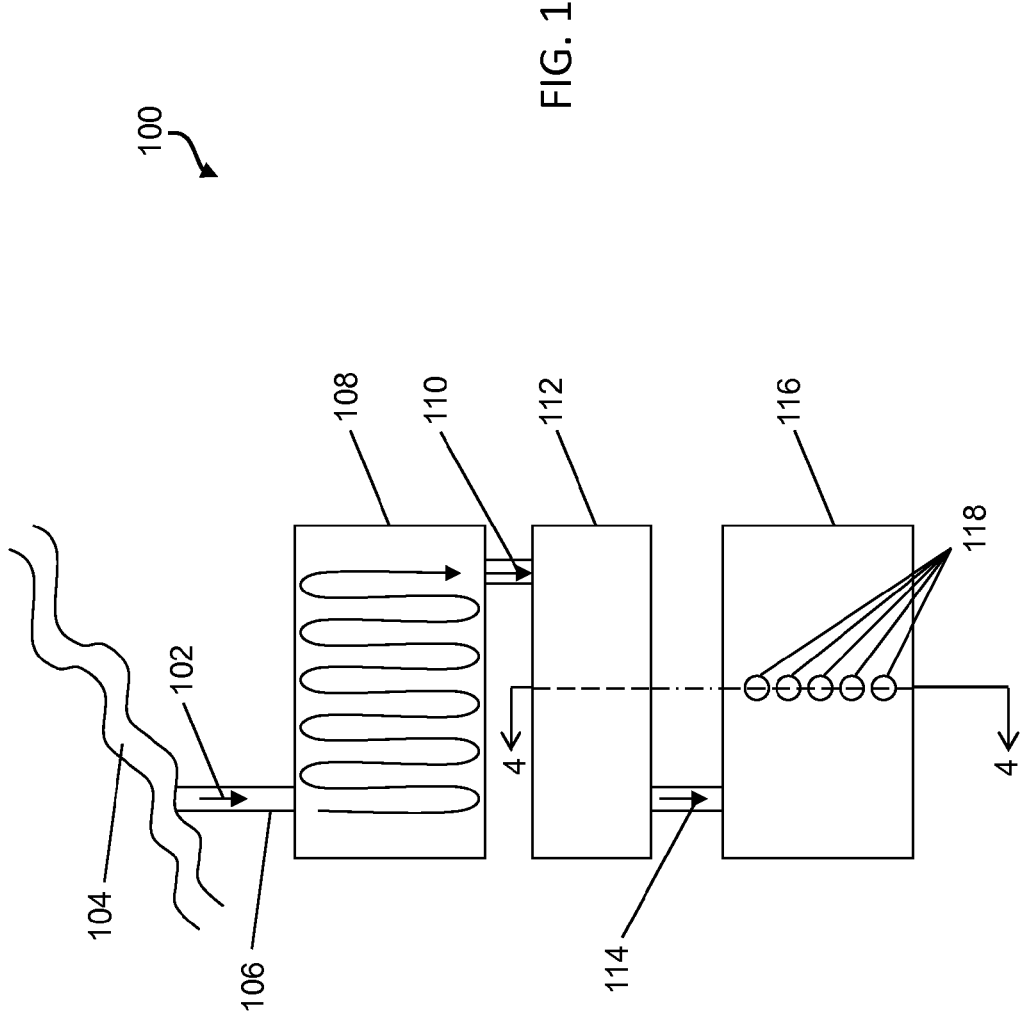
FIG. 1 is a schematic plan view showing an artificial recharge system having a constructed wetland, a sediment settling pond, and a recharge gallery with recharge wells, according to an exemplary embodiment of the disclosure.

An embodiment of an artificial recharge system 100 is shown in FIG. 1. Water flow, indicated by arrow 102, from a surface water source 104 (e.g., a river, lake, or reservoir) is routed by way of a regulated canal or pipeline 106 to a constructed wetland 108, which is used to remove sediment and improve surface-water quality. Recharge should be done with water that meets public health standards, especially if the aquifer is a drinking water supply. Water of improved water quality, indicated by arrow 110, is routed to a sediment settling pond 112 to provide additional sediment removal, if needed. Water, indicated by arrow 114, is then routed from the sediment settling pond 112 to a recharge gallery 116. The recharge gallery 116 contains one or more recharge wells 118. Alternatively, the water can be routed to a recharge pit (not shown), which is excavated sufficiently deep to intersect the aquifer to be recharged and requires no recharge wells. A recharge pit is appropriate primarily for a shallow aquifer, the top of which is within the reach of excavation equipment.

Figure 2:
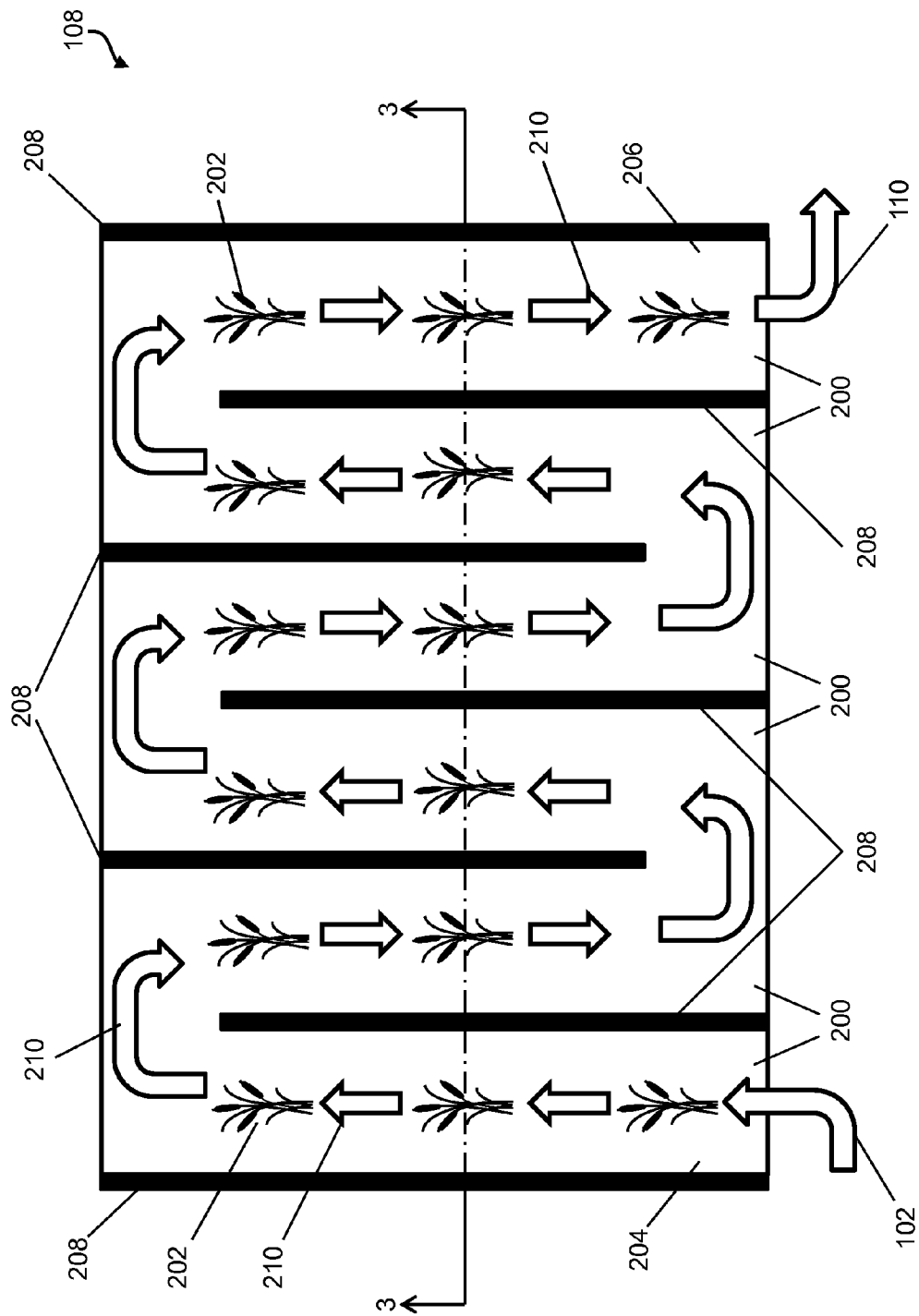
FIG. 2 is a schematic plan view of the constructed wetland system of FIG. 1.

FIG. 2 shows an embodiment of the constructed wetland 108 showing the general pattern of flow into, through, and out of the constructed wetland 108. The constructed wetland 108 is divided into a plurality of cells 200, each containing aquatic vegetation 202 such as cattails or other appropriate species. Plant types that are effective in removing contaminants are discussed in U.S. Environmental Protection Agency, 1988, Design manual: Constructed wetlands and aquatic plant systems for municipal wastewater treatment: U.S. Environmental Protection Agency Publication U.S. EPA/625/1-88/022, 83 p., the contents of which are incorporated herein by reference. The regulated surface-water flow 102 from the surface water source 104 enters a first cell 204 and exits a last cell 206. To route the water through the cells 200, impermeable clay dividers or dams 208 are positioned to retard water flow between the cells, each cell being lower in the ground than the preceding one so that the water flows by gravity. Water flow within the constructed wetland 108 is indicated by arrows 210. The water flow 210 through the cascading wetland cells 200 is circuitous or serpentine to maximize retention time allowing for suspended sediments to attach to the wetland plants 202 and for the wetland plants 202 to absorb nutrients and chemicals contained in the surface water 102. Constructed wetland design varies depending on the setting. The larger the constructed wetland, the larger the required or desired flow should be. The residence time of the water from the time the water enters the wetland to the time it leaves should be long enough to remove a sufficient amount of sediment and improve water quality to an acceptable level, and still have sufficient flow to keep the recharge gallery submerged.

Figure 3:
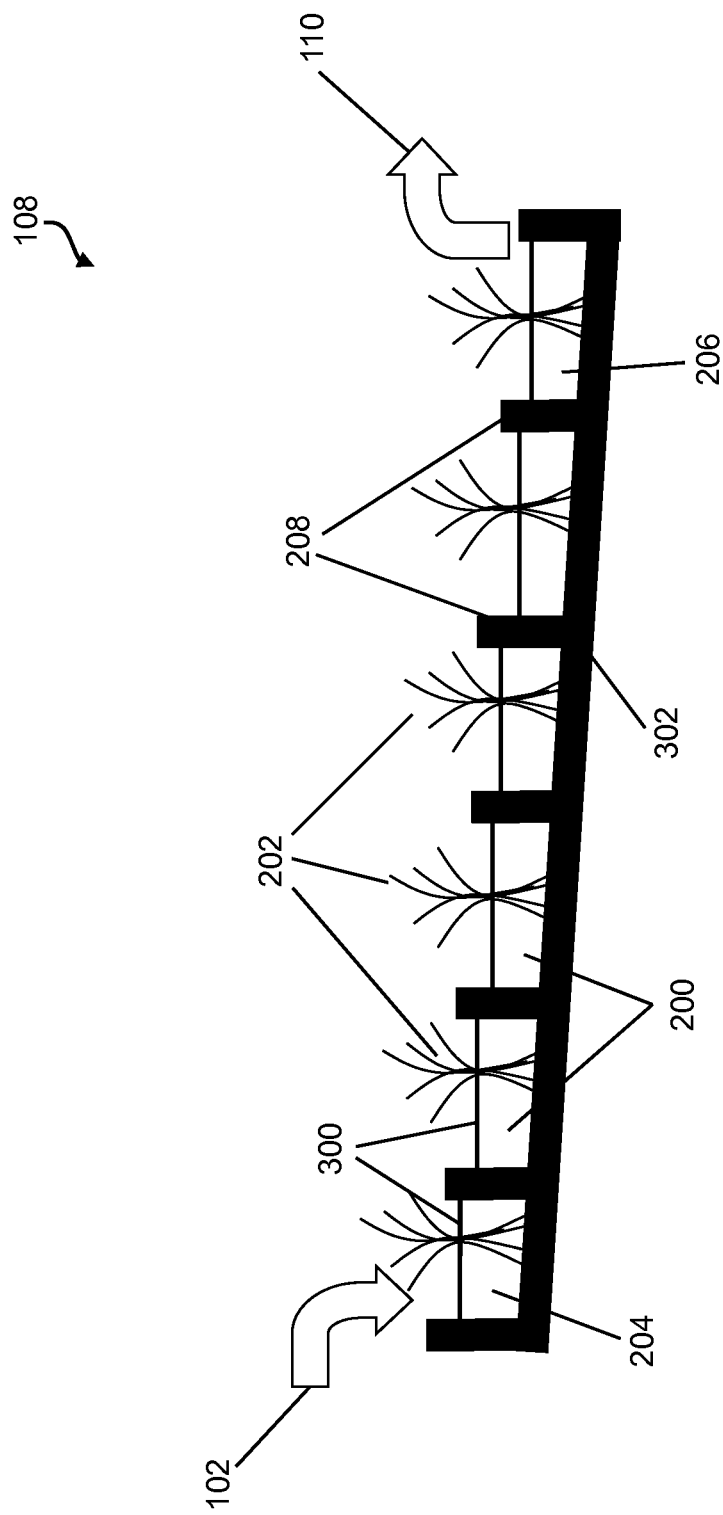
FIG. 3 is a cross section of the constructed wetland system taken along the line 3-3 of FIG. 2.

A cross section of the constructed wetland system 108 is shown in FIG. 3. FIG. 3 illustrates cascading water levels 300 in the sequence of wetland cells 200. Also, an impermeable clay bottom 302 is used to retain water and to prevent water from flowing vertically downward before exiting the constructed wetland system 108.

Figure 4:
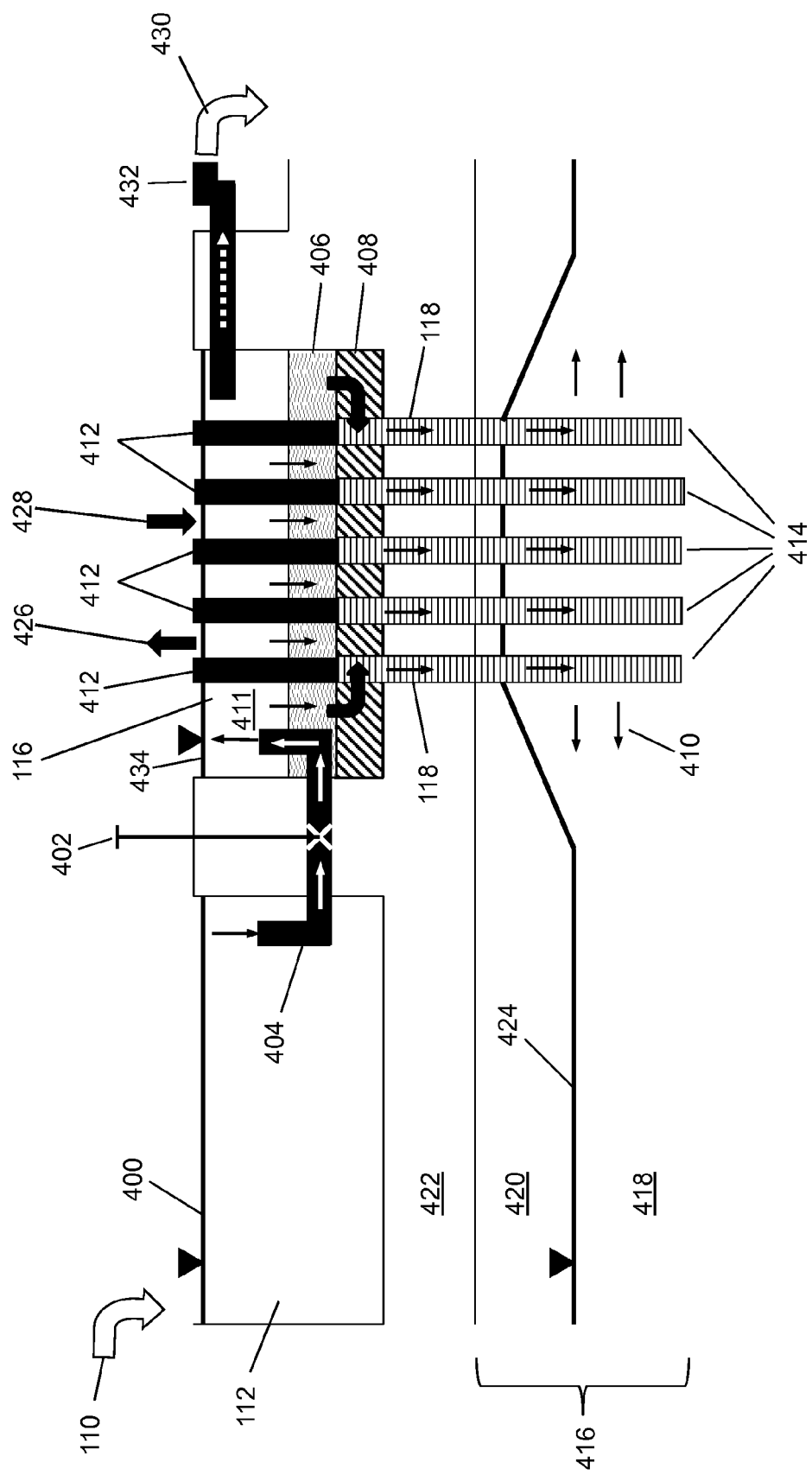
FIG. 4 is a cross section of the artificial recharge system taken along the line 4-4 of FIG. 1.

The surface-water flow 110 out of the last wetland cell 206 is then routed to the sediment settling pond 112, as shown in FIG. 4. The sediment settling pond 112 receives the treated water 110 from the constructed wetland 108. Water level 400 (surface water) within the sediment settling pond 112 is maintained by adjusting an inlet control valve 402 connected to a transfer pipe 404. By fully submerging the transfer pipe 404, less mixing of air occurs when compared to allowing water to pour into an air-filled vertical well bore. Water flows through the transfer pipe 404 into the recharge gallery 116 (or recharge pit), and continues to flow downward by gravity through a sand filter layer 406 and a gravel filter layer 408 installed within the recharge gallery 116. The sand filter layer 406 is preferably comprised of fine- or medium-sized sand particles having dimensions of about 0.25 mm to about 1 mm. The size of the sand particles is sufficiently fine to filter out any remaining sediment, but not so fine that the flow rate to the aquifer is too small. Also, the sand size should be large enough so that it can settle faster than any trapped fine sediments during backflushing (described below). The gravel filter layer 408 is preferably comprised of well sorted gravel ranging from about 5 mm to about 20 mm. The water flow direction is indicated by arrows 410. The water flowing into the recharge gallery 116 forms a water column 411 above the sand filter layer 406.

The recharge wells 118 are cased above the gravel layer 408 to adequately allow the sand filter 406 to remove any residual sediment or particulates. Casings 412 of the recharge wells 118 are sufficiently tall to prevent water from cascading down through the tops of the casings, minimizing air entrainment. Water enters each recharge well 118 through a well screen or mill slotted tubing 414 and exits the well screen into an aquifer 416 having a saturated alluvial aquifer 418 and an unsaturated alluvial aquifer 420. The gravel filter layer 408 positioned adjacent to the well screens 414 and the sand filter layer 406 filter the recharge water to prevent clogging of the recharge wells 118. Water bypasses impermeable material 422 (e.g., clay, caliche, or chalk, depending upon the location of the recharge gallery 116) and flows into the saturated alluvial aquifer 418 or other permeable water-bearing stratum. The water level 424 (ground water) in the saturated alluvial aquifer 418 rises as recharge progresses and the unsaturated zone of the alluvial aquifer 420 diminishes. Natural processes that affect the water available for recharge include evaporation 426 and precipitation 428. Excess surface water 430 flows out of the recharge gallery 116 via an overflow pipe 432, which also helps to control water level 434 in the recharge gallery 116.

Figure 5:
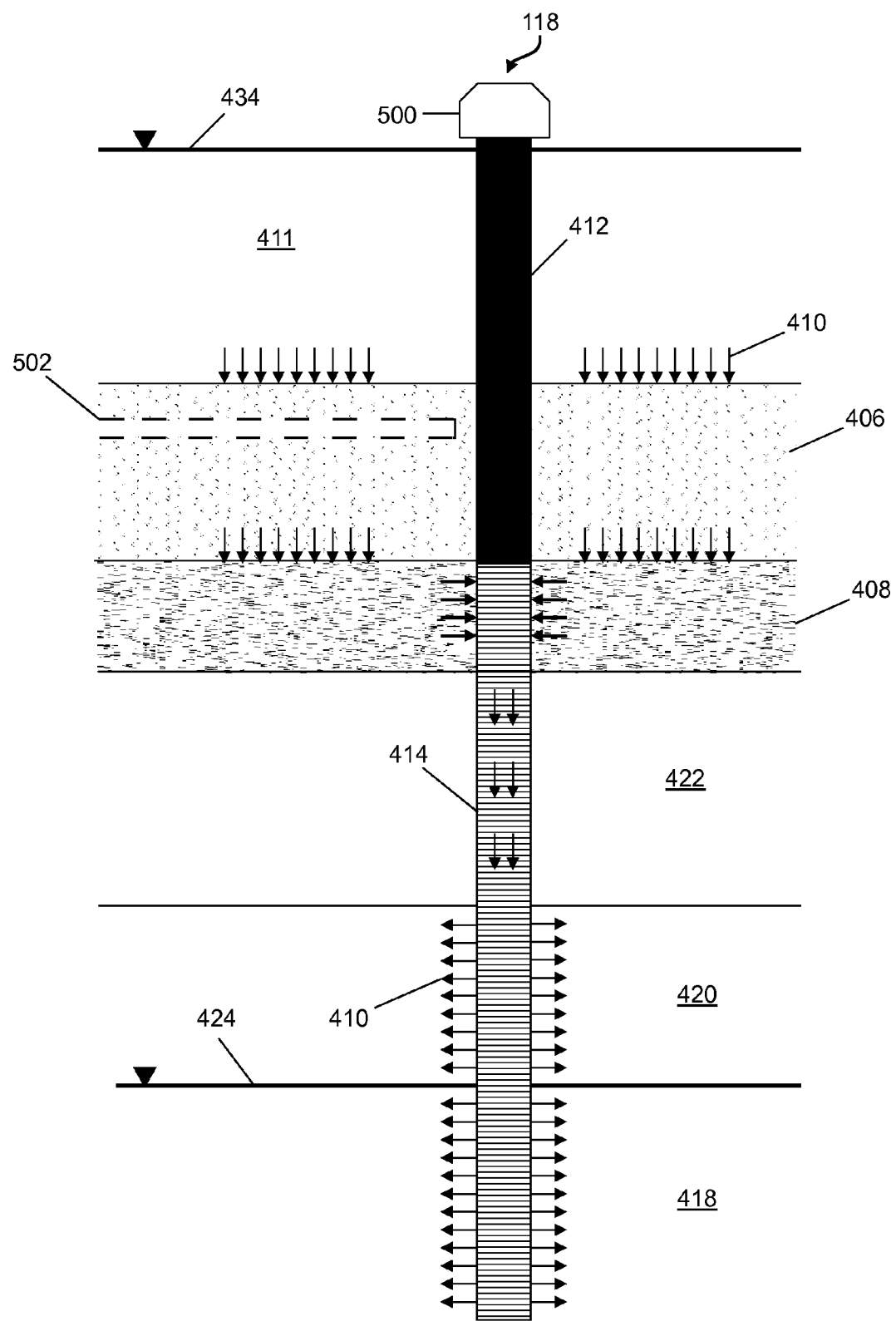
FIG. 5 is a close-up view of one of the recharge wells of FIG. 4, illustrating generalized flow in the artificial recharge gallery during a recharge event.

FIG. 5 shows one of the recharge wells 118 and illustrates downward water flow 410 that occurs during a recharge event. A well cap 500 is used to prevent flow of unfiltered water into the top of the well casing 412. The buildup of fine sediment or algae on the top of the sand filter layer 406 can affect downward water flow through the recharge gallery 116. To remove buildup of this material, a backflush perforated tubing or well screen 502 is installed below the top of the sand layer 406. The backflush tubing 502 can include, for example, multiple tubes connected to a clean-water source (not shown).

Figure 6:
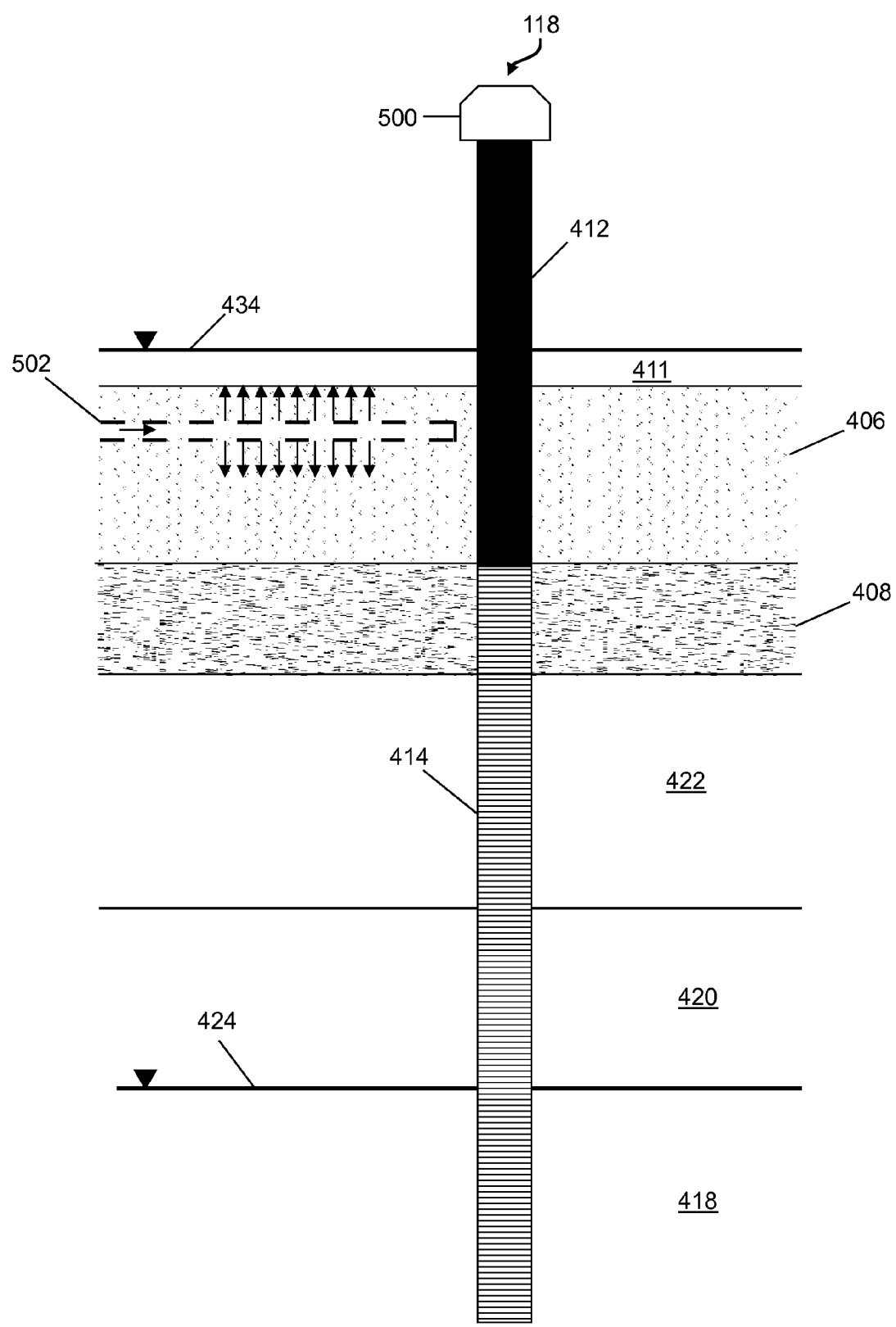
FIG. 6 is the recharge well of FIG. 5, illustrating generalized flow in the artificial recharge gallery during a backflushing event.

FIG. 6 illustrates backflushing of the sand filter layer 406. Water from the clean source (such as a nearby production well completed in the aquifer 416) is pumped into the backflush perforated tubing 502, causing the fine sediment and/or algae to be suspended in the water column 411 above the top of the sand layer 406. By lowering the water level 434, decreased downward flow will occur, and the water with suspended sediment and/or algae can be routed through the overflow pipe 432 (see FIG. 4). Stopping the flow of water through the backflush perforated tubing 502 allows the sand to settle within the recharge gallery 116. Breaking up accumulated fine sediment or algae by disking or roto-tilling can be used if the water is completely drained from the recharge gallery 116.

Automated controls, such as limit switches, pressure sensors, or flow meters that monitor and adjust inflow and outflow water, may be added at desired points throughout the system. Also, water quality monitoring sensors can be added to the constructed wetland 108 to monitor (e.g., turbidity, specific conductance, pH, and/or temperature) and restrict inflow to the sediment settling pond 112. These water-quality monitoring systems can be installed throughout the system to measure the effectiveness of the system in cleaning the initial surface water 104.

In another embodiment of the invention, if the constructed wetland 108 can provide water of sufficient quantity and quality to the recharge gallery 116, then the sediment settling pond 112 may not be needed. Alternatively, if the source water 104 is of excellent quality, the water can be routed directly from the source to either the sediment settling pond 112 or the recharge gallery 116.

The artificial recharge system described herein provides several advantages. First, the combination of the constructed wetland with the passive recharge gallery utilizing gravity flow for filtering provides a low cost, low energy system with minimal moving parts to wear out and no requirement for chemical treatment of the recharge water. Second, the use of sand and gravel filters adjacent to the wells to filter the recharge water prevents clogging of the wells, and the backflush mechanism removes sediment and particulates from the recharge water by suspending the fine sediment and organic materials above the sand filter bed. Further, utilization of existing storage volume in the unsaturated zone frees up land-surface area for agriculture or other purposes that might otherwise be used for a surface-water reservoir. The storage of water under ground reduces evaporation that would otherwise occur in a surface-water reservoir. Additionally, the constructed wetland environment provides a habitat for wildlife and the wetland plants can be harvested for biofuel production.

Although the invention has been described relative to a specific exemplary embodiment thereof, it will be appreciated by those skilled in the art that modifications and variations of the present invention are possible without departing from the principles and spirit of the invention, the scope of which is defined in the appended claims and their equivalents.

What is claimed is:

1. An artificial recharge system for recharging an aquifer, comprising:
    a constructed wetland that receives water from a surface water source, the constructed wetland having aquatic vegetation used to remove sediments and chemicals from the water;
    a settling pond to receive the water from the constructed wetland and provide additional sediment removal; and
    a porous recharge reservoir receiving the water from the settling pond, the recharge reservoir being hydraulically connected to the aquifer to recharge the aquifer with the water.

2. The artificial recharge system of claim 1, wherein the recharge reservoir is a recharge gallery comprising:
    a plurality of recharge wells extending into the aquifer to recharge the aquifer with the water;
    a gravel layer on the bottom of the recharge reservoir; and
    a sand layer on top of the gravel layer,
    wherein the sand layer and the gravel layer filter the water flowing into the recharge wells.

3. The artificial recharge system of claim 2, wherein each recharge well has an upper section that is cased above the gravel layer to prevent the water in a water column above the sand layer from bypassing the sand layer, and a perforated lower section that extends from the gravel layer into the aquifer.

4. The artificial recharge system of claim 2, further comprising a backflush tube with perforations to remove particulates from the sand layer, the backflush tube being located within the sand layer and connected to a clean water source, water from the clean water source exiting the backflush tube through the perforations into the sand layer, causing the particulates to be suspended in a water column above the sand layer for removal.

5. The artificial recharge system of claim 1, wherein the constructed wetland comprises:
    a plurality of cascading cells, each cell containing the aquatic vegetation;
    impermeable dividers defining each cell and creating a circuitous path for the water to flow from a first cell to a last cell, each cell being lower in the ground than the preceding cell so that the water flows from the first cell to the last cell by gravity, the circuitous path increasing retention time of the water in the constructed wetland to allow suspended sediments to attach to the aquatic vegetation and for the aquatic vegetation to absorb nutrients and chemicals contained in the water; and
    an impermeable bottom to prevent the water from flowing vertically downward.

6. The artificial recharge system of claim 1, further comprising:
    a transfer pipe, with a control valve, between the settling pond and the recharge reservoir, the control valve being adjusted to control a level of the water in the settling pond and transfer of the water from the settling pond to the recharge reservoir; and
    an overflow pipe extending from an end of the recharge reservoir to remove excess water from the recharge reservoir.

7. The artificial recharge system of claim 1, wherein the recharge reservoir is a recharge pit having a depth that intersects the aquifer.

8. The artificial recharge system of claim 1, further comprising:
    sensors placed in the constructed wetland, the settling pond, and the porous recharge reservoir to monitor water quality; and
    control devices to monitor and adjust inflow and outflow of the water to and from the constructed wetland, the settling pond, and the porous recharge reservoir based upon measurements of the sensors.

9. A method for artificially recharging an aquifer, comprising:
    constructing a wetland with aquatic vegetation, a settling pond, and a porous recharge reservoir;
    hydraulically connecting the recharge reservoir to the aquifer;
    transferring water from a surface water source to the constructed wetland;
    removing sediments and chemicals from the water in the wetland using the aquatic vegetation;
    transferring the water from the constructed wetland to the settling pond;
    removing sediments from the water in the settling pond;
    transferring the water from the settling pond to the recharge reservoir; and
    recharging the aquifer with the water in the recharge reservoir.

10. The method of claim 9, wherein said constructing a porous recharge reservoir comprises constructing a recharge gallery and said hydraulically connecting the recharge reservoir to the aquifer comprises constructing a plurality of recharge wells within the recharge gallery and extending the recharge wells into the aquifer.

11. The method of claim 10, wherein said constructing a porous recharge reservoir further comprises:
    placing a layer of gravel on a bottom of the recharge reservoir;
    placing a layer of sand on top of the layer of gravel; and
    filtering the water flowing down in the recharge gallery using the layer of sand and the layer of gravel.

12. The method of claim 11, wherein said constructing a plurality of recharge wells within the recharge gallery and extending the recharge wells into the aquifer comprises encasing an upper portion of each recharge well extending from a bottom of the layer of sand to a top of the recharge well, and perforating a lower portion of each recharge well that extends from the layer of gravel into the aquifer.

13. The method of claim 11, further comprising removing particulates from the layer of sand, said removing particulates from the layer of sand comprising:
    placing a perforated backflush tube within the layer of sand;
    connecting the perforated backflush tube to a clean water source;
    pumping water from the clean water source into the perforated backflush tube and through the perforations to suspend the particulates above the layer of sand; and
    removing the suspended particulates by lowering a level of water in the recharge gallery and routing the particulates through an overflow pipe connected to an end of the recharge gallery.

14. The method of claim 9, wherein said constructing a wetland comprises:
    dividing the wetland into a plurality of cascading cells, each cell being lower in the ground than the preceding cell;
    creating a circuitous path for the water to flow through the cells using impermeable dividers to define each cell;
    providing an impermeable bottom to prevent the water from flowing vertically downward; and
    planting the aquatic vegetation in each cell.

15. The method of claim 14, wherein said removing sediments and chemicals from the water in the wetland using the aquatic vegetation comprises allowing the water from the surface water source to flow through the circuitous path of the cascading cells by gravity, the circuitous path increasing retention time of the water in the constructed wetland to allow suspended sediments to attach to the aquatic vegetation and for the aquatic vegetation to absorb nutrients and chemicals contained in the water.

16. The method of claim 9, further comprising controlling a level of water in the settling pond and transferring the water from the settling pond to the recharge reservoir using a transfer pipe, with a control valve, located between the settling pond and the recharge reservoir.

17. The method of claim 9, wherein said constructing a porous recharge reservoir comprises constructing a recharge pit with a depth that intersects the aquifer.

18. The method of claim 9, further comprising:
monitoring water quality using sensors placed in the constructed wetland, the settling pond, and the porous recharge reservoir; and
monitoring and adjusting inflow and outflow of the water to and from the constructed wetland, the settling pond, and the porous recharge reservoir based upon measurements of the sensors.

19. An artificial recharge system for recharging an aquifer, comprising:
a constructed wetland that receives water from a surface water source, the constructed wetland having aquatic vegetation used to remove sediments and chemicals from the water;
a settling pond to receive the water from the constructed wetland and provide additional sediment removal;
a porous recharge reservoir receiving the water from the settling pond, the recharge reservoir having a plurality of recharge wells extending into the aquifer to supply the water to the aquifer;
a gravel layer on a bottom of the recharge reservoir and a sand layer on top of the gravel layer to filter the water flowing into the recharge wells; and
a backflush tube with perforations to remove particulates from the sand layer, the backflush tube being located within the sand layer and connected to a clean water source, water from the clean water source exiting the backflush tube through the perforations into the sand layer, causing the particulates to be suspended in a water column above the sand layer for removal.

20. The artificial recharge system of claim 19, wherein the constructed wetland comprises:
a plurality of cascading cells, each cell containing the aquatic vegetation;
impermeable dividers defining each cell and creating a circuitous path for the water to flow from a first cell to a last cell, each cell being lower in the ground than the preceding cell so that the water flows from the first cell to the last cell by gravity, the circuitous path increasing retention time of the water in the constructed wetland to allow suspended sediments to attach to the aquatic vegetation and for the aquatic vegetation to absorb nutrients and chemicals contained in the water; and
an impermeable bottom to prevent the water from flowing vertically downward.

\* \* \* \* \*